March 14, 1933.  A. L. JOHNSON  1,901,395
DIRECTION SIGNAL
Filed Jan. 13, 1931  2 Sheets-Sheet 1
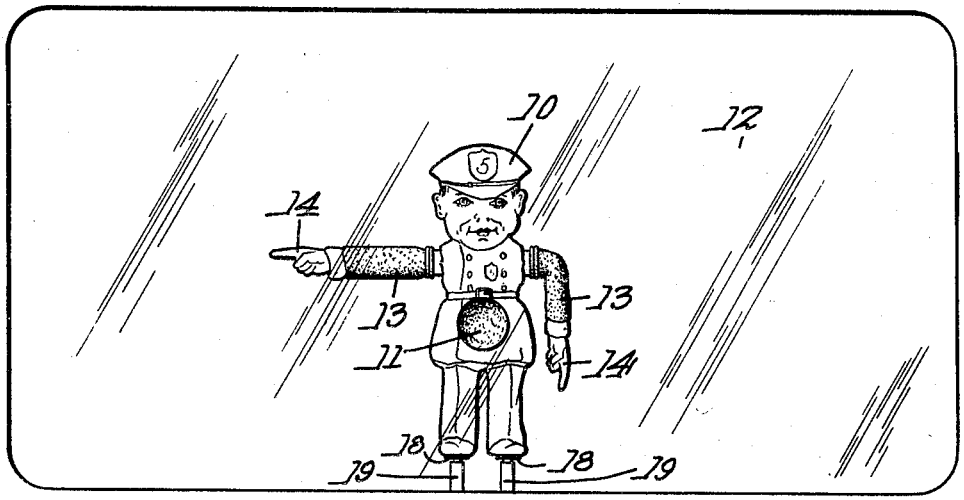
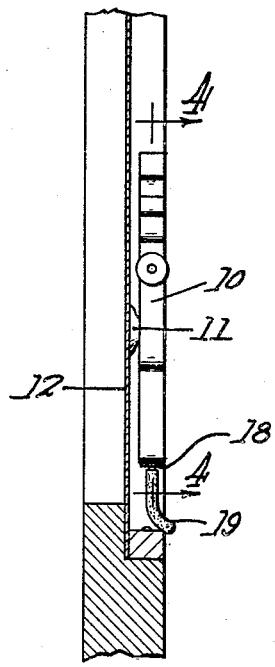
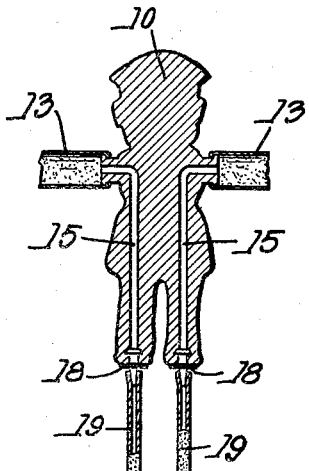
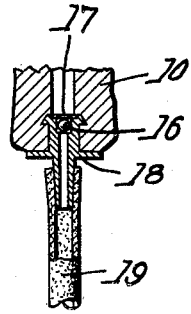
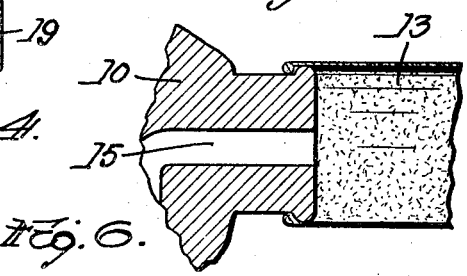

March 14, 1933.  A. L. JOHNSON  1,901,395
DIRECTION SIGNAL
Filed Jan. 13, 1931  2 Sheets-Sheet 2

Inventor
Alvin L. Johnson
By Attorneys

Patented Mar. 14, 1933

1,901,395

UNITED STATES PATENT OFFICE

ALVIN L. JOHNSON, OF WORCESTER, MASSACHUSETTS

DIRECTION SIGNAL

Application filed January 13, 1931. Serial No. 508,490.

The principal object of this invention is to provide a simple and easily visible direction signal, operable pneumatically and thus not involving the mechanical complications which have prevented most of the direction signals that have been invented from being put on the market. The invention also involves the provision of a signal at the rear or front of a car in which two arms or indicators are arranged to hang down by gravity normally and either one can be inflated and displaced to show unmistakably the proposed direction of movement simply by pressing a bulb on the steering column or elsewhere in the front of the car; to provide this signal in a simple inexpensive way; to provide a construction of very light materials having no mechanical parts likely to get out of order readily, and to provide a very simple means for attaching it, if it is to be applied to the rear window of a car; and also to provide means whereby when the signal indicator is expanded and put into operative position it will retain this position for a short time and then automatically collapse without any further attention on the part of the operator.

Other objects and advantages of the invention will appear hereinafter.

Reference is to be had to the accompanying drawings, in which

Fig. 1 is a rear view of a car window showing a preferred form of signal constructed in accordance with this invention in position therein;

Fig. 2 is a sectional view of the window showing the signal in side elevation but with the arms removed;

Fig. 3 is a sectional view through the center of the signal showing the means of attachment to the window;

Fig. 4 is a sectional view on the line 4—4 of Fig. 2;

Fig. 5 is an enlarged sectional view showing the connection of the operating tube with the signal device;

Fig. 6 is an enlarged sectional view showing the connection of the body of the signal device with the arm therefor;

Figure 7:
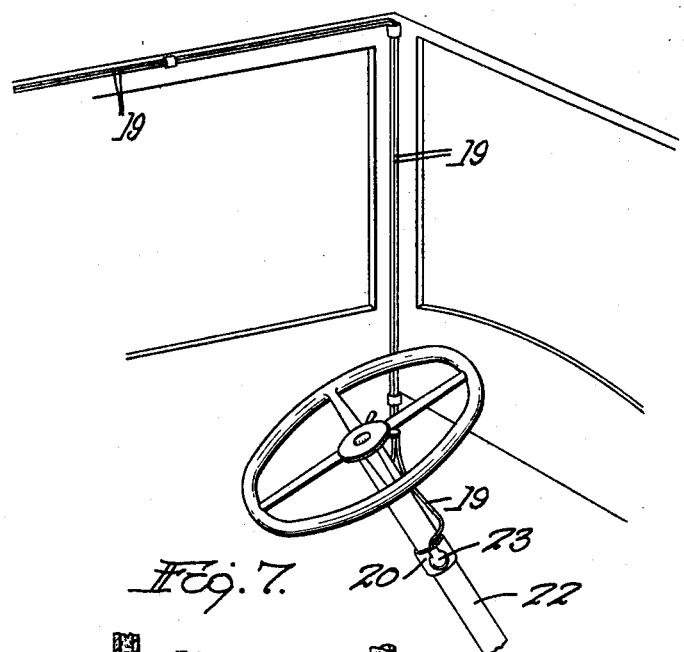
Fig. 7 is a perspective view of the front part of the inside of the car showing the operating means.
Figure 8:
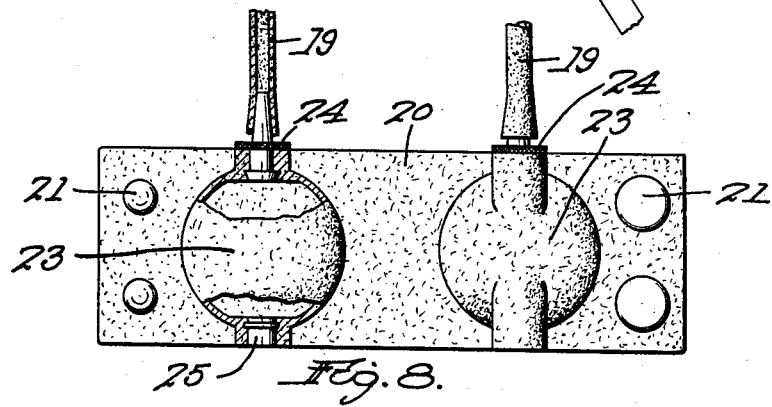
Fig. 8 is a view of the band adapted to go around the steering column expanded out flat and shown partly in section.
Figure 9:
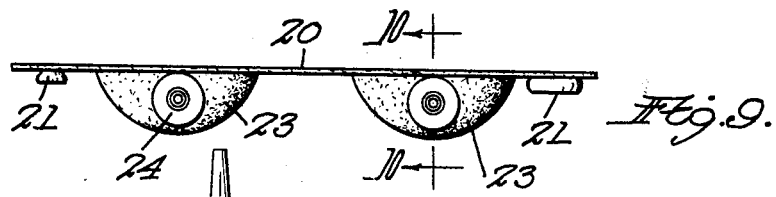
Fig. 9 is a plan of the same.
Figure 10:
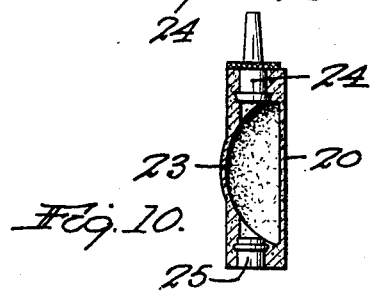
Fig. 10 is a sectional view on the line 10—10 of Fig. 9.

A signal device constructed in accordance with this invention preferably is provided with a body 10 which is thin but can be cut out and ornamented to imitate a person or animal as may be desired. This can be made of a light material as wood, pyroxylin or hard rubber and is provided with a suction cup 11 on what is really its front face, the face that is ornamented to give the desired appearance. This suction cup is intended to be pressed against the inside of the rear window 12 of the automobile to which it is applied. This holds the signal in upright position within the rear window and visible of course through it by parties in an approaching car. Also another one can be put on the windshield to indicate direction to cars, pedestrians and officers in front.

This body or image 10 is provided on opposite sides with a pair of collapsible tubes 13, constituting arms in the present case, each having an indicator 14 in the form of a hand, pointer or the like at the end. Within the body 10 are two separate passages 15 connected with these arms.

The passages 15 extend down to the bottom of the signal and are provided with nipples 18 set into the material in any desired way for receiving tubes 19. Each nipple is provided with a valve 16, shown as a gravity ball valve, against a grating 17 above to allow the air to pass freely into the passage 15. When, however, there is no pressure at the back and, the only pressure is on the top, this ball will be held to its seat by gravity and air pressure, but does not constitute a perfect pneumatic seal. The arms 13 will collapse gradually by leakage past the ball 16.

The tubes extend around the car, as indicated more especially in Fig. 7, and in the form indicated pass to a flexible strip 20, preferably of soft rubber, which is provided with detachable fastening devices 21 at its ends and secured around the steering column 22. This band 20 is provided with two pneumatic operating devices 23, as bulbs, plungers, or air bags formed by recesses therein and having soft thin walls so that pressure can be applied on the convex sides of these air bags by the finger or thumb to force the air out of them and through nipples 24 which are connected with the pipes 19. Each of these air bags is provided with a valve 25 the same as the valve 16.

The application of pressure on one of the bags or bulbs 23 forces the air through that pipe 19 and up through the passage 15 into one of the arms 13, inflating it, and thereby forcing it out as shown at the left in Fig. 1 by the fact that the arm is filled with air. In this case the indicator or hand 14 shows the direction of intended motion. As soon as the pressure is relieved from the bulb 23, the air will commence to leak out past the valves 16 and 25 and after a while the arm will fall down by deflation as shown at the right in Fig. 1.

It will be seen therefore that the indicators are inflated in a very simple manner and after the operator has pushed on the bulb 23 with his finger or thumb instantaneously he does not need to keep pushing on it or to pay any further attention to it. He can direct all his attention to driving and the indicator will remain inflated for a reasonable length of time and then drop of its own accord. This constitutes a very simple device without complicated mechanical features, entirely without levers and moving parts extending through the car or even cords to pull and there is little or nothing to get out of order. These devices will last several seasons when once installed and can be sold cheaply on the market and installed at small expense.

Although I have illustrated and described only one form of the invention, I am aware of the fact that modifications can be made therein by any person skilled in the art without departing from the scope of the invention as expressed in the claims. Therefore I do not wish to be limited in this respect, but what I do claim is:—

1. The combination with a car having a window and a steering column, of a pneumatic direction signal having a suction cup thereon for holding it against the window on the inside, said signal having two opposite collapsible arms connected with the interior of the signal separately, a flexible band detachably mounted on the steering column having two flexible air bags therein, and a flexible tube connecting each air bag with one of said arms.

2. The combination with a car having a window and a steering column, of a pneumatic direction signal having two opposite collapsible arms connected with the interior of the signal separately, a flexible band detachably mounted on the steering column having two flexible air bags therein, and a flexible tube connecting each air bag with one of said arms.

In testimony whereof I have hereunto affixed my signature.

ALVIN L. JOHNSON.